United States Patent [19]

Jakatdar

[11] Patent Number: 5,495,553
[45] Date of Patent: Feb. 27, 1996

[54] RECOGNIZER FOR RECOGNIZING VOICE MESSAGES IN PULSE CODE MODULATED FORMAT

[75] Inventor: Priya Jakatdar, Westport, Conn.

[73] Assignee: Nynex Corporation, New York, N.Y.

[21] Appl. No.: 170,452

[22] Filed: Dec. 20, 1993

Related U.S. Application Data

[63] Continuation of Ser. No. 811,172, Dec. 19, 1991, abandoned.

[51] Int. Cl.[6] ........................................ G10L 9/00
[52] U.S. Cl. ............................. 395/2.6; 395/2.4
[58] Field of Search ....................... 395/2.21, 2.4–2.66; 381/41–47; 379/67, 88, 89, 58

[56] References Cited

U.S. PATENT DOCUMENTS

| | | | |
|---|---|---|---|
| 4,063,031 | 12/1977 | Grunza | 381/43 |
| 4,426,733 | 1/1984 | Brenig | 381/43 |
| 4,449,190 | 5/1984 | Flanagan et al. | 381/46 |
| 5,033,088 | 7/1991 | Shipman | 381/43 |
| 5,042,063 | 8/1991 | Sakanishi et al. | 381/43 |

Primary Examiner—Allen R. MacDonald
Assistant Examiner—Michelle Doerrler
Attorney, Agent, or Firm—Loren Swingle

[57] ABSTRACT

A recognition device and method for recognizing a voice message in the form of pulse code modulation (PCM) digital signals indicative of samples of the voice message. The device and method are adapted such that a recognition result is not provided if the digital signal content satisfies certain requirements which are indicative of a likely erroneous recognition result. The recognition device and method are further adapted to reduce errors in recognizing voice messages of the same message content but different amplitude, as well as to permit simultaneous recognition and storing for recording of a voice message.

26 Claims, 3 Drawing Sheets

RECOGNIZER FOR RECOGNIZING VOICE MESSAGES IN PULSE CODE MODULATED FORMAT

This is a continuation application under 37 CFR 1.62 of the prior application Ser. No. 07/811,172, filed Dec. 19, 1991, now abandoned.

BACKGROUND OF THE INVENTION

This invention relates to recognition of voice messages and, in particular, to recognition of voice messages carried in pulse code modulated (PCM) form.

Voice recognizers and voice recognition systems and methods are known and have been used in a variety of applications. One application is in state of the art telephone systems which offer services based upon speech interaction between the telephone subscriber and the system.

In systems of this type, speech responses by the subscriber are used to directly invoke system operations which previously required key or dial entry. An example of such a service is speech invoked auto-dialing.

In this type of dialing, the subscriber is able to access a speech server coupled to the central office switch of the system. The speech server is, in turn, able to recognize telephone numbers to be dialed based upon speech entries by the subscriber. A recognized telephone number is then transmitted by the speech server to the central office switch. The switch then proceeds to interconnect the number as if it had been keyed in or dialed in conventional fashion by the subscriber.

In the above voice activated systems, there may be a number of interactions between the subscriber and the speech server. Thus, voice prompts generated by the speech server may be needed to invoke speech responses by the subscriber which must then be recognized by the server. An integral part of the server is the voice recognition equipment used to recognize the speech input of the subscriber.

Conventional speech recognizers have been proposed for this type of recognition. These recognizers operate on PCM digital signals which are formed from voice samples derived from the voice message.

In this type of application, a recognizer usually is required to recognize only a limited number of voice messages from each subscriber. The recognizer in most cases is initially trained based on repeated entries by the subscriber of the set of voice messages which are desired to be later recognized. PCM digital signals representing the samples of these voice messages are then processed in accordance with statistical algorithms or functions to develop so-called "templates" which are indicative of a given voice message. These templates are then stored for use during the recognition procedure.

During recognition, PCM digital signals representative of a voice message to be recognized are first formed. These signals are then applied to the voice recognizer which processes the signals following the same statistical algorithms or functions used during learning. This results in so-called "tokens" being developed from the PCM digital signals. These tokens are then compared with the stored templates and when a sufficient match is realized, the voice message is recognized as that indicated by the matched templates. This completes the recognition process.

While present day recognizers can successfully perform recognition in this way, they have certain limitations which detract from their overall usefulness, particularly their usefulness in the above-mentioned telephone system application. One limitation of these known recognizers is their perceived failure rate. Typical recognizers might be perceived to provide a wrong or invalid recognition a relatively high percentage of the time. This reduces user confidence, which is particularly undesirable in telephone system applications. Also, with present day recognizers, if a voice message is to be recorded as well as recognized, a separate recording system must be used in parallel with the recognizer. This increases the overall cost of the system, again making the system less attractive for telephone applications.

Finally, present day voice recognizers are susceptible to errors based upon changes in the amplitude of the incoming voice message. Thus, a voice message spoken at one level might be recognized, but the same voice message spoken at another amplitude level might not be recognized. This limitation makes the recognizers less satisfactory for telephone and other applications, where different voice levels may occur frequently.

It is therefore a primary object of the present invention to provide a voice recognition device and method which overcomes one or more disadvantages of the above prior recognition devices.

It is a further object of the present invention to provide a voice recognition device and method which has a lower perceived failure rate.

It is still another object of the present invention to provide a voice recognition device and method in which recognition errors due to changes in amplitude level of the voice messages are reduced.

It is also an object of the present invention to provide a voice recognition device and method in which recognition and recording of the voice message can be simultaneously carried out.

SUMMARY OF THE INVENTION

In accordance with the principles of the present invention, the above and other objectives are realized, at least in part, by a recognition practice in which a first means is provided for receiving PCM digital signals corresponding to samples of a spoken voice message. This first means establishes first and second times which define a recognition interval during which the voice message to be recognized is to be spoken.

Once the PCM digital signals are received, the first means is adapted to process these signals to provide a voice recognition result indicative of a recognized voice message corresponding to the spoken voice message. A further means is also provided to evaluate preselected characteristics of the digital signals and based thereon to either permit the recognition result of the first means to be output as a valid recognition or to provide an output indicating that a valid recognition has not been made.

In the particular embodiment of the invention to be disclosed hereinafter, the occurrence of first predetermined PCM digital signal content starting at or immediately after the first time (indicating that the voice message was likely spoken too soon), the occurrence of second predetermined PCM digital signal content at or immediately after the second time (indicating that the voice message was likely spoken too late) or the occurrence of third predetermined PCM digital signal content over a period exceeding a preselected duration (indicating that the voice message was likely spoken too long) each result in an indication that a valid recognition has not been made. In the disclosed embodiment, the digital signal content examined in each case is a measure of the average energy in the respective digital signal content over a particular period of the signals. This energy in each case is compared with a respective threshold value and if the threshold is exceeded, the recognition result is deemed invalid.

In a second aspect of the invention, a recognition practice is provided in which a first recognition means as above-described is also used. In this case, a further means is provided which makes the first means less susceptible to error in recognizing the same voice message at different amplitude levels. In the embodiment of the invention to be disclosed hereinafter, this is achieved by the further means controlling the statistical processing of the PCM digital signals representing the voice message samples.

This digital processing is based, in part, on forming autocorrelation coefficients for sequences or so-called "frames" of the PCM digital signals representing a given voice message. When a frame is processed by the autocorrelation processing, the R(O) autocorrelation coefficient is first formed. This coefficient is a measure of the energy in the PCM digital signals forming the frame and is equal to the sum of the squares of the signals.

The R(O) autocorrelation coefficient is then examined for its most significant bit and this bit and a preselected number of bits following this bit are then used to define a normalized autocorrelation function R'(O). All other autocorrelation coefficients R(j) for the frame are then formed by multiplying appropriate digital signals and summing the products. Each autocorrelation coefficient R(j) is then used to define a corresponding normalized autocorrelation function R'(j) by selecting for the normalized coefficient R'(j) the sequence of bits of the coefficient R(j) which are in the same bit positions as the sequence of bits selected from R(O) for the coefficient R'(O).

The above processing is carried out similarly for every other frame of the given voice signal. The resultant autocorrelation coefficients for each frame are then also similarly further statistically processed as, for example, by developing linear predictive coding coefficients, cepstral coefficients and quantized cepstral coefficients.

By processing the frames of PCM signals of each of the voice signals as above-described, the result is to reduce the effect that different amplitudes levels have on recognizing the same voice message. In particular, the selection of the R'(O) coefficient bits of each of the different level voice messages based on the most significant bit of the corresponding R(O) coefficient tends to remove from the messages their relative amplitude differences. This makes it easier to achieve a correct recognition for similar voice messages of different amplitude.

In still a further aspect of the invention, a recognition apparatus and method are provided which again include a first means as described above. In this case, a further means is provided for storing all the frames of the PCM digital signals during the processing of the digital signals by the first means. The stored frames in the further means are marked to indicate the beginning and end of the message and thus serve to provide a simultaneous recording of the voice message as it is being recognized.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
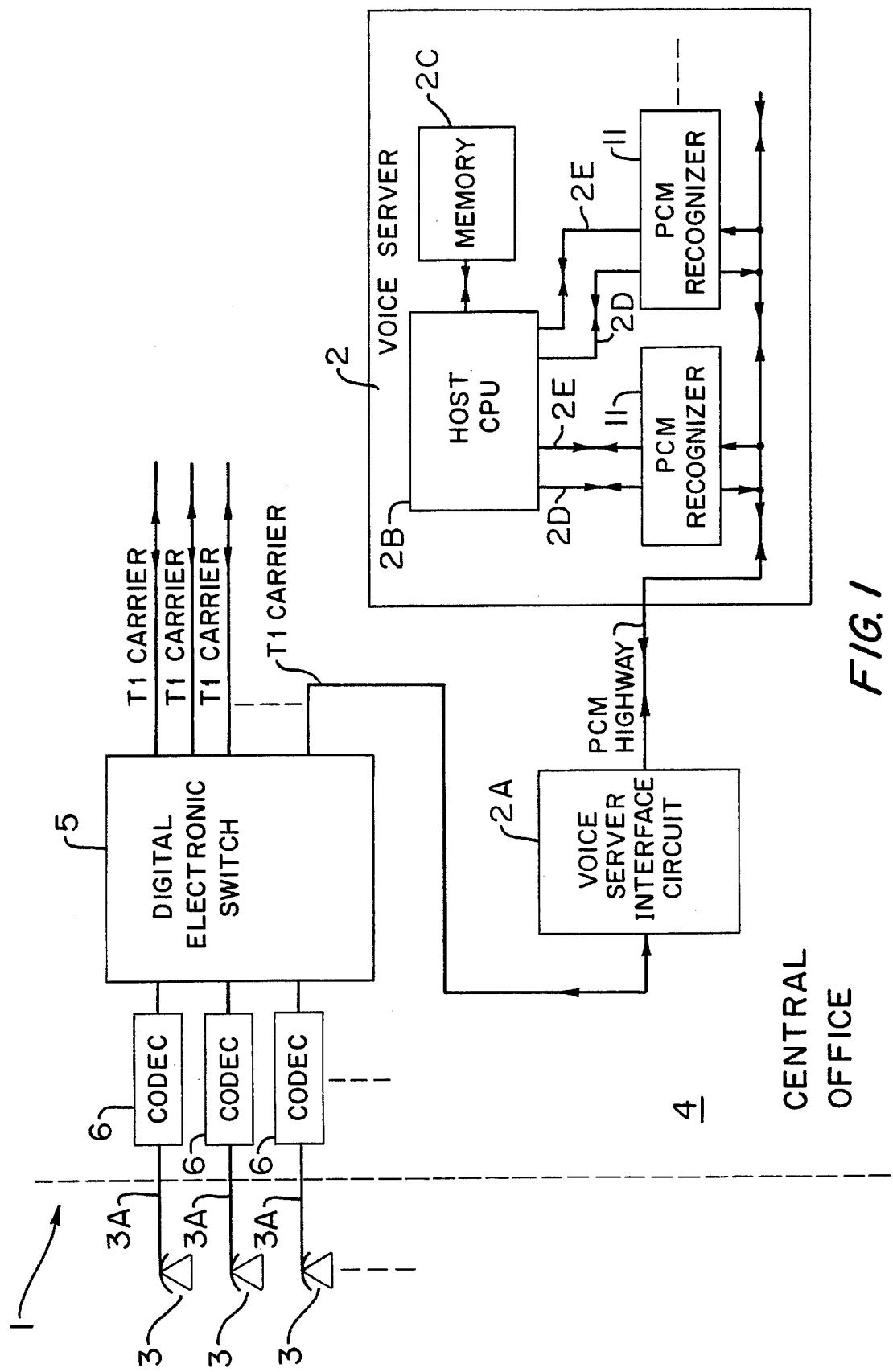
FIG. 1 shows a telephone system having a voice server which uses voice recognizers in accordance with the principles of the present.

FIG. 1 shows a telephone system 1 which uses a voice server 2 which is adapted to provide a variety of voice activated services to certain of the subscribers 3 served by the system. The voice server 2 includes one or more PCM voice recognizers 11 designed in accordance with the principles of the present invention.

As shown, the voice server 2 communicates with a digital electronic switch 5 for providing call connection for the subscribers 3 and which is located in a telephone central office 4. At the central office 4, each of the subscriber lines or channels 3A is connected to the switch 5 through a coder/decoder (codec) 6.

Each codec 6 converts the analog voice messages in the voice channel of its respective subscriber 3 to PCM digital form for coupling to the switch 5. Conversely, PCM digital signals containing voice messages from the switch 5 are converted to analog voice messages by each codec 6 for coupling to the respective subscriber voice channel 3A.

In a typical system in which each analog voice message is a 4 KHz band-limited signal, each codec samples an incoming analog voice message at a 8 KHz rate. Each sample, in turn, is then quantized to one of a number of signal levels, each of which is translated into a PCM signal of a specified number of bits and bit pattern. In a conventional system, each PCM digital signal indicative of a voice sample is a compressed signal consisting of 8 bits forming a so-called "byte".

The electronic switch 5 assembles the PCM digital signals of the voice channels onto a number of time division multiplexed (TDM) carriers for transmission and call connection. A typical so-called "T1 carrier" will carry 24 channels with associated signalling and control information.

In the system of FIG. 1, the switch 5 communicates with the voice server 2 over one or more preselected TDM carriers. These carriers are assigned to carry voice channels whose subscriber service plans include one or more of the voice actived services provided by the voice server 2.

As shown, each of these carriers is first coupled through a voice server interface circuit 2A which removes the above-mentioned usual telephone signalling and control information in the TDM carrier, since is not needed by the server. The resultant PCM highway signals from the interface 2A thus contain the PCM digital signals of the voice message samples in the carried voice channels.

Each PCM highway signal is coupled to one or more of the PCM voice recognizers 11 included in the voice server 2. Each recognizer 11, in turn, is coupled through respective data and address busses 2D and 2E to the host CPU 2B of the voice server 2. The voice server 2 also includes a memory unit 2C which can include RAM, ROM and disk storage and which is coupled to the host CPU 2B.

To carry out its voice activated services, the voice server 2 communicates with each of the voice channels 3A having access to the server using prompts and stored voices messages which are generated by the host CPU 2B and memory 2C. The prompts and stored voice messages for a particular voice channel 3A are coupled through the respective recognizer 11 serving the channel onto the channel for return to the subscriber through the interface 2A, switch 5 and respective codec 6.

The subscriber 3, upon receipt of the recorded voice messages and prompts, provides a voice message response on its channel 3A. This voice message response is received at the respective voice recognizer 11 in PCM digital signal form corresponding to samples of the message. The recognizer 11 then carries out a recognition process in which it attempts to recognize the voice message from the PCM digital signals.

Thereafter, the recognizer 11 provides a signal to the host CPU 2B which, depending upon the signal, takes appropriate action to continue the voice service being accessed. This action might be an instruction to the switch 5 to make a particular connection for the voice channel, if the voice accessed service is an auto-dialing service and the recognition results identify a particular number being called. It might also be the supply by the CPU 2B of further prompts and recorded voice messages to the voice channel, if, as described further below, a valid recognition has not been made and a repeat of the voice message response is required.

Figure 2:
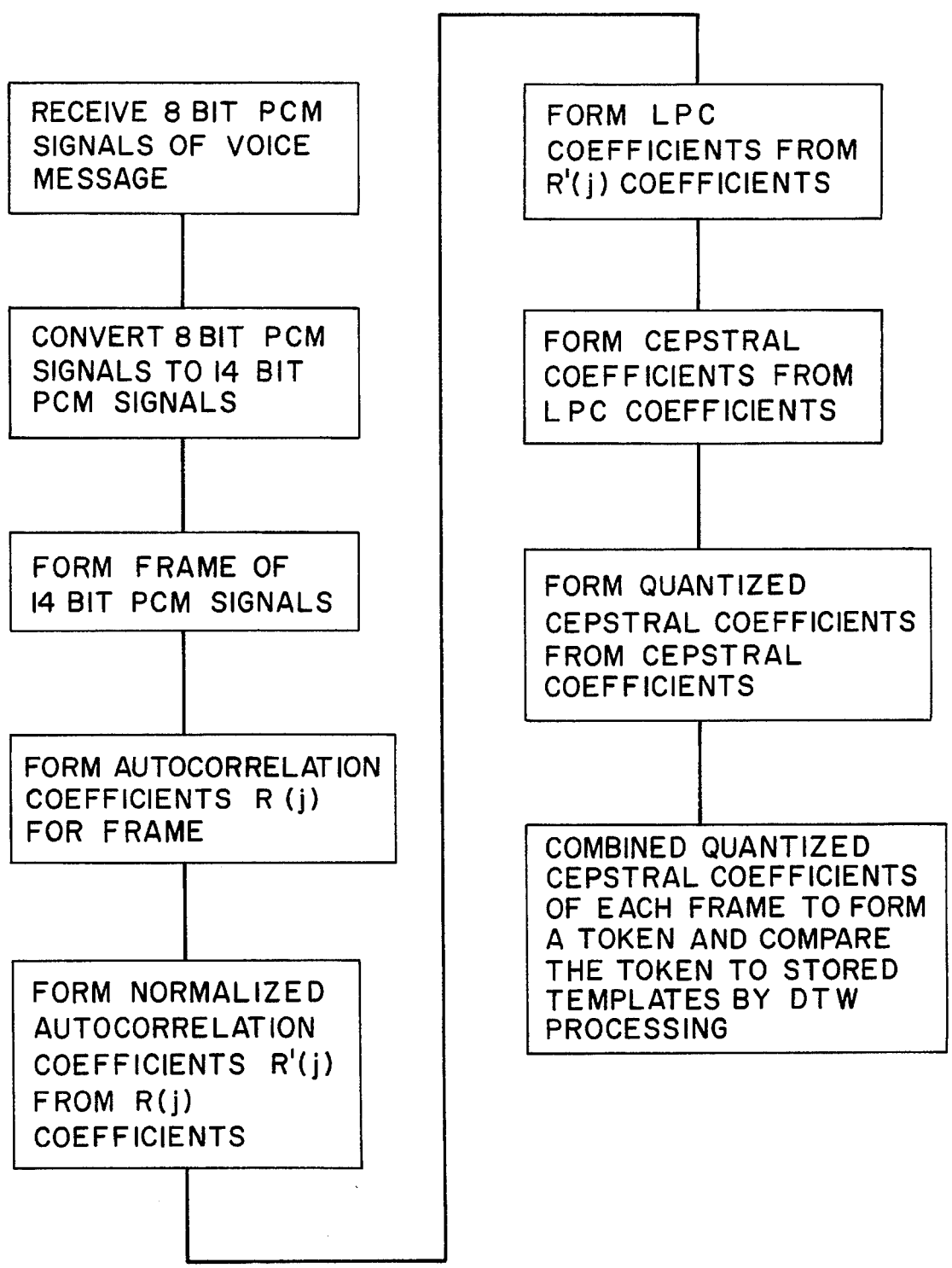
FIG. 2 illustrates schematically the recognition processing carried out by a voice recognizer in the voice server of FIG. 1.

Each recognizer 11 is adapted to perform its recognition processing of a voice message on a channel in accordance with certain conventional practices and further in accordance with certain unique practices which follow the principles of the present invention. In particular, voice recognition is carried out using statistical digital signal processing of the incoming PCM digital signals representing the voice message samples. This processing is illustrated in FIG. 2.

Each 8 bit PCM digital signal when received at the recognizer is first transformed into a 14 bit linear PCM signal. The 14 bit PCM signals as they are formed are then assembled into frames each containing a given number N of signals (e.g., 240 signals). Each frame is then processed separately when it is formed.

The statistical processing of each frame involves first forming a number of (e.g., 10) autocorrelation coefficients by multiplying the PCM digital signals in the frame with each other in accordance with the formula:

$$R(j) = \sum_{k=1}^{N=240} x(k+j) x(k),$$

As can be appreciated, the R(O) autocorrelation coefficient represents the sum of the squares of the PCM digital signals in a frame. Hence, R(O) is a measure of the energy contained in these signals and, thus, the energy contained in the samples of the voice message over the frame. As can be also appreciated, the coefficients R(j) will contain a larger number of bits then the individual PCM signals x(j) and x(k+j) and for the bit numbers given will consist of up to 36 bits. To make it easier for the recognizer 11 to carry out the further statistical digital processing required, the autocorrelation values R(j) are redefined or normalized to 16 bit coefficients R'(j).

The normalized autocorrelation values coefficients R'(j) are then used in standard fashion to form a number of (e.g., 10) linear predicative coding (LPC) coefficients also of 16 bits each. The latter coefficients are then further processed to form a number of (e.g. 10) 16 bit cepstral coefficents. The cepstral coefficients are then quantized to form a number of (e.g., 10) quantized cepstral coefficients of 4 bits each.

The quantized cepstral coefficients for each frame of a voice message are grouped or combined together to define a token for the voice message. Each token is then compared to templates previously formed in one or more training sessions by the subscriber on the given voice channel. These templates define a predetermined set of voice messages of the subscriber which are desired to be later recognized when the subscriber uses the services of the server 2.

During the training session, each of these voice messages is repeatedly spoken by the subscriber and the resultant PCM digital signals undergo similar processing as above-described to form quantized cepstral coefficients which define the aforementioned templates. Since a number of frames of PCM signals will typically be formed for a voice message, these frames form the template that will be generated for each predetermined voice message.

Comparison of each token with the corresponding voice message templates is carried out by known dynamic time warp (DTW) processing. When the token for a given voice message has been compared with the associated voice message templates, a recognition decision is reached and the results of the recognition decision are passed on to the CPU 2B of the server 2 or, as discussed below, the server is advised that a valid recognition cannot be made. The server then takes appropriate action to continue with the particular voice activated service being accessed.

Figure 3:
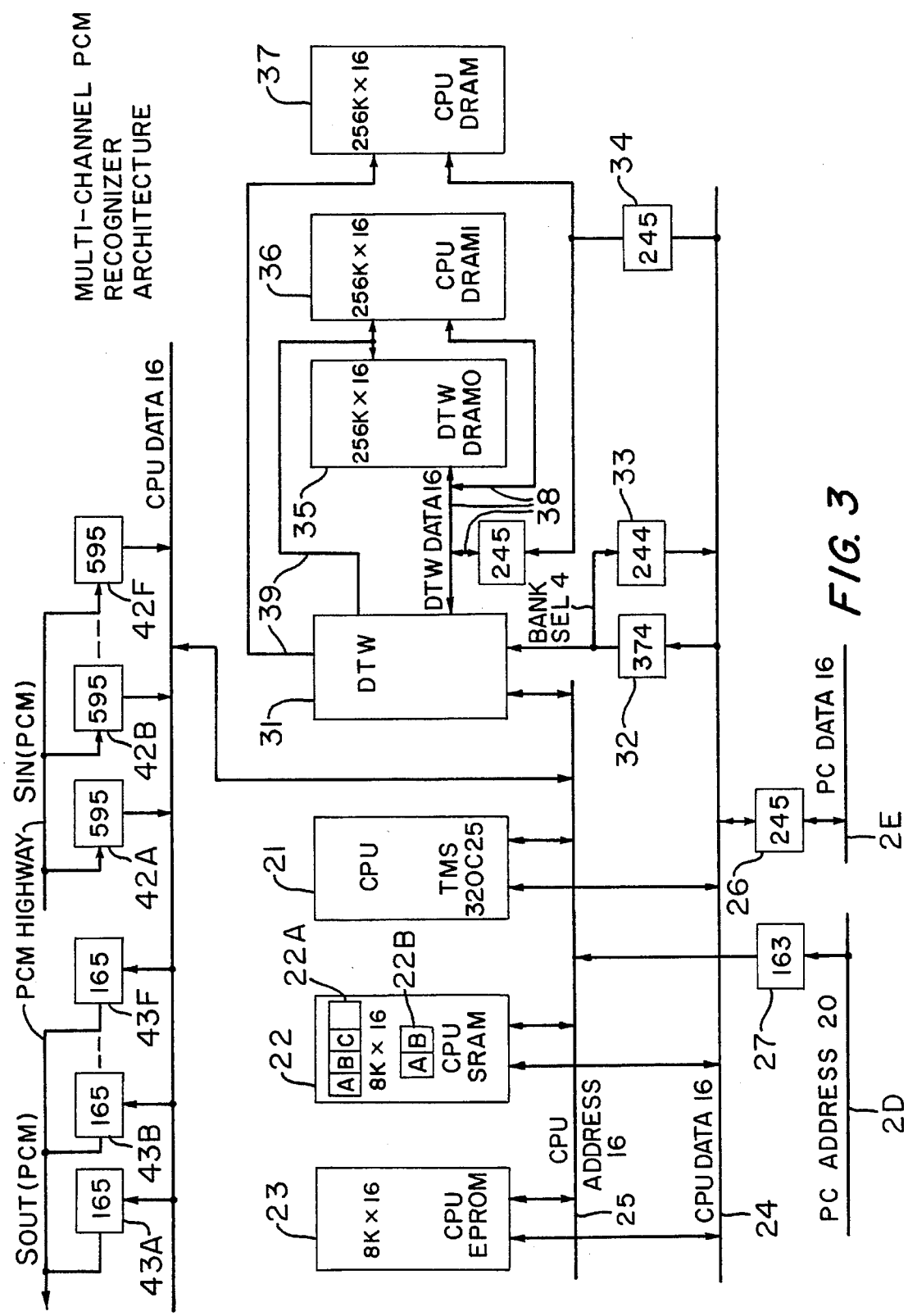
FIG. 3 shows in greater detail a circuit implementation of a voice recognizer in the voice server of FIG. 1.

FIG. 3 shows a particular circuit impletation which can be used for each of the recognizers 11. As shown, the recognizer 11 includes a main central processing unit (CPU) 21 which is provided with memory units in the form of SRAM 22 and EPROM 23. These units communicate with each other over data and address lines 24 and 25. These address lines also communicate through buffers 26 and 27 with the data and address lines of the host CPU 2B of the server 2.

A dynamic time warp (DTW) processor 31 communicates with the recognizer CPU address line 25 directly and with the recognizer CPU data line through incoming and outgoing buffers 32 and 33. The DTW processor 31 is provided with a plurality of memory units, DRAM0 35, DRAM1 36 and DRAM2 37, which communicate with the DTW processor 31 over suitable data and address buses 38 and 39. The recognizer CPU data line 24 also communicates through a buffer 34 with the DTW data bus 38.

A plurality of further input buffers 42A . . . 42F communicate with the particular PCM highway whose voice channels are to be served by the recognizer. Likewise, a plurality of output buffers 43A . . . 43F also communicate with the PCM highway to provide return signals, e.g., voice messages and prompts, to the voice channels. Each of these buffers provides double buffering and serial-to-parallel conversion of the PCM digital signals it receives from and places on the PCM highway, so that voice message information is not lost.

The PCM highway contains clock and voice channel synch signals which are used to identify the separate voice message channels carried by the highway and to clock them into the respective input buffers 42A–42F. In the present implementation, the recognizer 11 can accommodate only six of these channels, via the six buffers 42A–42F. As a result, as shown in FIG. 1, a plurality of recognizers 11 may have to be used for each PCM highway signal if all the voice channels on the highway are to be serviced.

In accordance with the principles of the present invention, each recognizer 11 is further designed so as to be able to recognize the voice messages in its respective channels in a manner which reduces the perceived failure rate of the recognizer. This is accomplished by adapting the recognizer to examine or evaluate preselected characteristics of the PCM digital signals indicative of a voice message and, based thereon, to inhibit or prevent the results of a recognition decision from being sent to the server CPU 2B as a valid recognition.

In the event a valid recognition cannot be made, the recognizer CPU 21 advises the server CPU 2B of this fact, causing the CPU 2B to take appropriate action in accordance with the service being accessed. Thus, as above-noted, the server CPU 2B might cause a voice message to be sent back to the subscriber over the voice channel, via the respective recognizer 11, asking the subscriber to repeat the voice message.

More particularly, the CPU 21 of the recognizer is adapted in this manner by defining a recognition interval and requiring for recognition that the voice message from the subscriber be uttered or spoken within this interval. The recognition interval can be indicated to the subscriber by prompts such as, for example, first and second beeps at the first and second times defining the interval. The recognizer CPU 21 is further adapted to perform its recognition only for voice messages which do not exceed a preselected time period or duration.

Based upon examination of the PCM signals indicative of the samples of a given voice message, if one or more of these criteria or requirements are violated or not satisfied, the results of the recognition decision reached by the recognizer will be treated by the CPU 21 as invalid. As can be appreciated, failure to satisfy these requirements would normally likely result in erroneous recognition results by the recognizer 11. By treating these results as invalid, they are no longer used by the server 2. The recognizer 11 is thus perceived to be wrong a fewer number of times, thereby reducing its perceived error or failure rate.

In the present illustrative case, the CPU 21 makes the aforesaid determination of the validity of the recognition results by examining the frames of the PCM digital signals comprising the voice message being recognized. Particularly, it checks or examines one or more of the frames occurring at or immediately following the first and second times, respectively, defining the recognition interval. It also checks or examines all of the frames as they are being formed throughout the interval. In each case, this examination involves obtaining a measure of the average energy of the PCM signals in the examined frame or frames. This is readily accomplished via the CPU 21 averaging the values of the R(O) autocorrelation coefficients of the frames, since each of these coefficients, as above-indicated, provides a measure of the energy in its respective frame.

By comparing each resultant energy value with a respective preselected threshold, the recognizer CPU 21 determines whether any requirements have been violated. In particular, it determines whether the voice message started at or close to the first time and thus was likely spoken before the start of the recognition interval, i.e., was likely spoken too soon. Likewise, it determines whether the message was present at the second time and, thus was likely spoken after the end of the recognition interval, i.e., was spoken too late. Finally, it determines the duration of the voice message and, hence, whether it exceeded the preselected duration, i.e., was likely spoken too long.

If any of these conditions are found, the CPU 21 then determines the recognition results to be invalid and so advises the server CPU 2B, as above-described. By so adapting the recognizer 11, situations in which there is a higher likelihood of recognizer error are eliminated from the recognition process, thereby reducing the perceived failure rate of the recognizer.

In addition to the above adaptation, each recognizer 11 is further adapted in accordance with the principles of the invention, to reduce errors which might result when recognizing voice messages having the same content, but different amplitude levels. Such errors might arise during the statistical processing of the PCM signals and, in particular, during formation of the above-discussed normalized coefficients R'(j).

More particularly, in forming these autocorrelation coefficients from the R(j) autocorrelation coefficients, certain of the bits of the R(j) coefficient are discarded. As can be appreciated, if the bits in the first 16 bit positions of each R(j) coefficient are selected for the corresponding R'(j) coefficient irrespective of the amplitude level of a voice message, for the same voice message, the selected bit sequence for the lower amplitude signal will differ from that of the higher amplitude signal. This will lead to different LPC, cepstral and quantized cepstral coefficients and thus different tokens for the same voice message. Depending upon the degree of difference, differences in recognition of the same voice message at the different amplitude levels might occur.

In accordance with the principles of the invention, it has been recognized that erroneous recognitions in this regard can be reduced by appropriate selection of the particular bits of the autocorrelation coefficients R(j) chosen to be included in the normalized autocorrelation coefficients R'(j) for the PCM signals of each frame. Thus, in accordance with the invention, the bits for the R'(O) autocorrelation coefficient for a frame are first selected as the sequence of bits of the R(O) coefficient which start with the most significant bit position in R(O). Once the bit positions of this sequence of bits is identified, each remaining normalized autocorrelation coefficient R'(j) for a frame is determined from its respective autocorrelation function R(j) by selecting the sequences of bits which are in the identified bit positions.

By following the above selection procedure in realizing the normalized autocorrelation coefficients R'(j) of all the frames of each voice message, the CPU 21 reduces any of differences in the normalized autocorrelation coefficients derived for the same voice messages of different amplitudes. As a result, the tendency of the recognizer to provide different recognitions for these messages is also reduced.

In a further aspect of the invention, each recognizer 11 is also adapted to simultaneously record voice messages as they are being recognized. Thus, the recognizer CPU 21 is further configured to store in a separate voice message buffer 22A of the SRAM 22 the sequence of frames of a voice message as the individual frames are supplied to a recognition buffer 22B which is used in the recognition processing.

In particular, the recognition buffer 22B stores two frames of PCM signals, one of which is being processed for recognition by the CPU 21 and the other of which is the next frame to be processed. When the recognition process of the current frame A is complete, the next frame B is processed and the contents of the frame A are replaced by a new frame C which is next to be processed, thereby destroying the frame A in the buffer 22B.

The voice message buffer 22A, however, stores all the frames A, B and C in sequence and continues to likewise sequentially store the other frames of the voice message being processed. The first and last frame of a voice message are marked by the recognizer CPU 21 as they are entered into the buffer 22A so that the voice message is then identified and suitably stored for permanent recording.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is

1. A recognition device for use in recognizing a voice message by analyzing pulse code modulation (PCM) digital signals representing samples of the voice message, the recognition device comprising:

first means for: establishing independently of said voice message a recognition interval between first and second times and during which said voice message is desired to be spoken; and responsive to said PCM digital signals processing said PCM digital signals to provide a voice recognition result indicative of said voice message;

and further means for evaluating preselected characteristics of said PCM digital signals in relation to said recognition interval and based thereon to either permit said voice recognition result to be output as a valid voice recognition result or to provide an output indicating that a valid voice recognition result has not been made; said further means providing said output indicating that a valid voice recognition result has not been made upon an evaluation by said further means of said PCM digital signals which indicates the happening of one or more of the following: first predetermined PCM digital signal content occurring at or immediately following said first time; second predetermined PCM digital signal content occurring at or after said second time; third predetermined PCM digital signal content occurring within said recognition interval over a third period of time exceeding a preselected duration.

2. A recognition device in accordance with claim 2 wherein:

said first predetermined PCM digital signal content is indicative of said PCM digital signals having at least a first average energy over a first period of time, said first average energy exceeding a first threshold value;

said second predetermined PCM digital signal content is indicative of said PCM digital signals having at least a second average energy over a second period of time, said second average energy exceeding a second threshold value;

and said third predetermined PCM digital signal content is indicative of said PCM digital signals having at least a third average energy over said third period of time, said third average energy exceeding a third threshold value.

3. A recognition device in accordance with claim 1 wherein:

said first means processes said PCM digital signals in frames each including a plurality of said PCM digital signals;

said first period of time occurs at or immediately following said first time and is of extent sufficient to include one or more of said frames;

said second period of time occurs at or immediately following said second time and is of extent sufficient to include one or more of said frames;

and said third period of time is of extent sufficient to include all said frames.

4. A recognition device in accordance with claim 3 wherein:

said first means processes said PCM digital signals by developing for said frames a token and by comparing this token to stored templates indicative of predetermined voice messages whose frames have been similarly processed by said first means.

5. A recognition device in accordance with claim 4 wherein:

said processing by said first means includes for each frame: forming a set of autocorrelation coefficients from the PCM digital signals in the frame; forming a set of modified autocorrelation coefficients from the autocorrelation coefficients; forming a set of linear predictive coding coefficients from the modified autocorrelation coefficients; forming a set of cepstral coefficients from the linear predictive coding coefficients; and forming a set of quantized cepstral coefficients from the cepstral coefficients;

and said processing by said first means further includes combining said quantized cepstral coefficients formed for each frame into a token.

6. A recognition device for use in recognizing a voice message by analyzing pulse code modulation (PCM) digital signals representing samples of the voice message, the recognition device comprising:

first means responsive to said PCM digital signals for processing said PCM digital signals to provide a voice recognition result indicative of said voice message;

and further means for controlling said first means such that said processing by said first means of PCM digital signals representing voice messages having the same voice message content but different amplitude levels is less likely to provide a voice recognition result different than a voice recognition result which would be provided in the absence of said further means.

7. A recognition device in accordance with claim 6 wherein:

said processing by said first means includes: processing said PCM digital signals in frames each including a plurality of PCM digital signals.

8. A recognition device in accordance with claim 7 wherein:

said processing by said first means of each frame includes: forming a set of M autocorrelation coefficients using the formula:

$$R(j) = \sum_{k=1}^{k=N} x(j)\, x(j+k)$$

where J=0 to M-1, N is an integer greater than one and is equal to the total number of PCM digital signals in the frame, x(j) and x(j+k) are (j)th and (j+k)th PCM signals in the frame, and M is an integer greater than 1;

and said further means controls said first means such that said processing by said first means further includes forming modified autocorrelation coefficients R'(j) from said autocorrelation coefficients R(j) and determining the least significant bit of the autocorrelation coefficient R(O), said modified autocorrelation coefficient R'(O) being formed from the sequence of bits of the coefficient R(O) starting with said most significant bit of R(O) and said other modified autocorrelation coefficients R'(l) to R'M-l) being formed from the sequence of bits of the corresponding autocorrelation coefficients R(l) to R(M-l) which are in the same bit positions as the bit positions of the sequence of bits of R(O) used to form R'(O);

and said first means further processes said modified autocorrelation coefficients to form said voice recognition result.

9. A recognition device in accordance with claim 8 wherein:

said processing of said modified autocorrelation coefficients R'(j) of each of said frames by said first means includes: forming a set of linear predictive coding coefficients from said modified autocorrelation coefficients; forming a set of cepstral coefficients from said linear predictive coding coefficients; and forming a set of quantized cepstral coefficients from said cepstral coefficients.

10. A recognition device in accordance with claim 9 wherein:

said quantized cepstral coefficients of each frame together define a token;

and said processing by said first means further includes for each token comparing the token to stored templates indicative of predetermined voice messages whose frames have been similarly processed by said first means.

11. A recognition device for use in recognizing a voice message by analyzing pulse code modulation (PCM) digital signals representing samples of the voice message comprising:

first means responsive to said PCM digital signals for processing said PCM digital signals to provide a voice recognition result indicative of said voice message, said first means including a storage means for storing only a part of the PCM digital signals during processing of said PCM digital signals by said first means;

and further means responsive to said PCM digital signals and including further storage means for storing all said PCM digital signals so as to be able to permanently record said voice message, said further means storing said PCM digital signals in said further storage means during processing of said PCM digital signals by said first means to provide said voice recognition result.

12. A voice recognizer in accordance with claim 11 wherein:

said first means processes said digital signals in frames, each of which includes a plurality of digital signals;

said first storage means has a capacity for storing one or more but less than all of the frames comprising said voice message;

and said further storage means has capacity for storing all said frames comprising said voice message.

13. A voice recognizer in accordance with claim 11 wherein:

said further means marks the first and last frames of said voice message to identify said voice message in said further storage means.

14. A method for use in recognizing a voice message by analyzing pulse code modulation (PCM) digital signals representing samples of the voice message, the method comprising:

establishing independently of said voice message a recognition interval between first and second times and during which said voice message is desired to be spoken;

processing said PCM digital signals to provide a voice recognition result indicative of said voice message;

and evaluating preselected characteristics of said PCM digital signals in relation to said recognition interval and based thereon to either permit said voice recognition result to be output as a valid voice recognition result or to provide an output indicating that a valid voice recognition result has not been made; said evaluating step providing said output indicating that a valid voice recognition result has not been made upon the happening of one or more of the following: first predetermined PCM digital signal content occurring at or immediately following said first time; second predetermined PCM digital signal content occurring at or after said second time; third predetermined PCM digital signal content occurring within said recognition interval over a third period of time exceeding a preselected duration.

15. A method in accordance with claim 14 wherein:

said first predetermined PCM digital signal content is indicative of said PCM digital signals having at least a first average energy over a first period of time, said first average energy exceeding a first threshold value;

said second predetermined PCM digital signal content is indicative of said PCM digital signals having at least a second average energy over a second period of time, said second average energy exceeding a second threshold value;

and said third predetermined PCM digital signal content is indicative of said PCM digital signals having at least a third average energy over said third period of time, said third average energy exceeding a third threshold value.

16. A method in accordance with claim 14 wherein:

said processing of said PCM digital signals occurs in frames each including a plurality of said PCM digital signals;

said first period of time occurs at or immediately following said first time and is of extent sufficient to include one or more of said frames;

said second period of time occurs at or immediately following said second time and is of extent sufficient to include one or more of said frames;

and said third period of time is of extent sufficient to include all said frames.

17. A method in accordance with claim 16 wherein:

said processing of said PCM digital signals includes developing for said frames a token and comparing this token to stored templates indicative of predetermined voice messages whose frames have been similarly processed by said first means.

18. A method in accordance with claim 17 wherein:

said processing includes for each frame: forming a set of autocorrelation coefficients from the PCM digital signals in the frame; forming a set of modified autocorrelation coefficients from the autocorrelation coefficients; forming a set of linear predictive coding coefficients from the modified autocorrelation coefficients; forming a set of cepstral coefficients from the linear predictive coding coefficients; and forming a set of quantized cepstral coefficients from the cepstral coefficients;

and said processing further includes combining said quantized cepstral coefficients formed for each frame into a token.

19. A method for use in recognizing a voice message by analyzing pulse code modulation (PCM) digital signals representing samples of the voice message, the method comprising:

processing said PCM digital signals to provide a voice recognition result indicative of said voice message;

and controlling said processing of PCM digital signals representing voice messages having the same voice message content but different amplitude levels so that said processing is less likely to provide a voice recognition result different than a voice recognition result which would be provided in the absence of said control.

20. A method in accordance with claim 19 wherein:

said processing includes: processing said PCM digital signals in frames each including a plurality of PCM digital signals.

21. A method in accordance with claim 20 wherein:

said processing of each frame includes: forming a set of M autocorrelation coefficients using the formula:

$$R(j) = \sum_{k=1}^{k=N} x(j) x(j+k)$$

where J=0 to M-1, N is an integer greater than one and is equal to the total number of PCM digital signals in the frame, x(j) and x(j+k) are (j)th and (j+k)th PCM signals in the frame, and M is an integer greater than one;

said controlling of said processing further includes causing said processing to form modified autocorrelation coefficients R'(j) from said autocorrelation coefficients R(j) and determining the least significant bit of the autocorrelation coefficient R(O), said modified autocorrelation coefficient R'(O) being formed from the sequence of bits of the coefficient R(O) starting with said most significant bit of R(O) and said other modified autocorrelation coefficients R'(l) to R'(M-l) being formed from the sequence of bits of the corresponding autocorrelation coefficients R(l) to R(M-l) which are in the same bit positions as the bit positions of the sequence of bits of R(O) used to form R'(O);

and said processing processes said modified autocorrelation coefficients to form said recognition result.

22. A method in accordance with claim 21 wherein:

said processing of said modified autocorrelation coefficients R'(j) of each of said frames includes: forming a set of linear predictive coding coefficients from said modified autocorrelation coefficients; forming a set of cepstral coefficients from said linear predictive coding coefficients; and forming a set of quantized cepstral coefficients from said cepstral coefficients.

23. A method in accordance with claim 22 wherein:

said quantized cepstral coefficients of each frame together define a token;

and said processing further includes for each token comparing the token to stored templates indicative of predetermined voice messages whose frames have been similarly processed in said processing step.

24. A method for use in recognizing a voice message by analyzing pulse modulation (PCM) digital signals representing samples of the voice message comprising:

processing in a recognition device said PCM digital signals to provide a voice recognition result indicative of said voice message, said processing including storing in a storage means of said recognition device only a part of the PCM digital signals during processing of said PCM digital signals;

and further storing all said PCM digital signals in a further storage means in said recognition device so as to be able to permanently record said voice message, said further storing of said PCM digital signals in said further storage means occurring during processing of said PCM digital signals to provide said recognition result.

25. A method in accordance with claim 24 wherein:

said processing of said digital signals occurs in frames, each of which includes a plurality of digital signals;

said storage means has a capacity for storing one or more but less than all of the frames comprising said voice message;

and said further storage means has capacity for storing all said frames comprising said voice message.

26. A method in accordance with claim 24 wherein:

said frames include a first frame and a last frame; and said further storing includes marking said first and last frames to identify the voice message in said further storage means.

* * * * *

UNITED STATES PATENT AND TRADEMARK OFFICE
CERTIFICATE OF CORRECTION

PATENT NO. : 5,495,553
DATED : February 27, 1996
INVENTOR(S) : Priya Jakatdar

It is certified that error appears in the above-indentified patent and that said Letters Patent is hereby corrected as shown below:

Col. 5, line 46, insert -- where j=0-9 --.

Col. 10, line 56, change "R10)" to -- R(0) --.

Col. 10, line 60, change "R'M-1)" to -- R(M-1) --.

Col. 13, line 16, change "J=0" to -- j=0 --.

Signed and Sealed this

Thirtieth Day of July, 1996

Attest:

BRUCE LEHMAN

Attesting Officer    Commissioner of Patents and Trademarks